United States Patent [19]

Yamazawa et al.

[11] Patent Number: 5,780,070

[45] Date of Patent: Jul. 14, 1998

[54] APPARATUS FOR SOLIDIFYING AND SHAPING OPTICALLY CURED FLUID BY CARRYING OUT SCANNING SIMULTANEOUSLY WITH RECOATING

[75] Inventors: Kenji Yamazawa; Toshiki Niino; Takeo Nakagawa, all of Wako; Seiji Hayano, Inagi, all of Japan

[73] Assignees: Institute of Physical and Chemical Research (RIKEN), Saitama; Shimat Co., Ltd., Tokyo, both of Japan

[21] Appl. No.: 799,807

[22] Filed: Feb. 13, 1997

[30] Foreign Application Priority Data

Feb. 14, 1996 [JP] Japan ..................... 8-026368

[51] Int. Cl.⁶ .................. B29C 35/08; B29C 41/02
[52] U.S. Cl. ........................ 425/174.4; 264/401
[58] Field of Search ............... 425/174.4; 264/401, 264/497; 118/120, 620, 423; 427/510, 356, 358

[56] References Cited

U.S. PATENT DOCUMENTS

| | | | |
|---|---|---|---|
| 4,801,477 | 1/1989 | Fudim | 264/401 |
| 5,174,931 | 12/1992 | Almquist et al. | 425/174.4 |
| 5,238,614 | 8/1993 | Uchinono et al. | 425/174.4 |
| 5,432,045 | 7/1995 | Nakamura et al. | 425/174.4 |
| 5,626,919 | 5/1997 | Chapman et al. | 425/174.4 |
| 5,647,931 | 7/1997 | Retallick et al. | 425/174.4 |

FOREIGN PATENT DOCUMENTS

| | | |
|---|---|---|
| 0 597 114 A1 | 5/1994 | European Pat. Off. |
| B2-5-33900 | 5/1993 | Japan |
| B2-7-94149 | 10/1995 | Japan |
| A 9-141747 | 6/1997 | Japan |
| WO 93/24303 | 12/1993 | WIPO |

*Primary Examiner*—Robert Davis
*Attorney, Agent, or Firm*—Griffin, Buter, Whisenhunt & Szipl, LLP

[57] ABSTRACT

There is provided an apparatus for solidifying and shaping fluid which can be optically cured, including (a) an optically scanning device for scanning a level of fluid which can be optically cured, with a light beam, (b) a sinking device for sinking a layer having been cured by scanning carried out by the optically scanning device, below a level of the fluid, and (c) a recoat device for covering a cured layer having been sunk in the step (b), with a fluid which is not yet cured. The recoat device is formed with a recoater blade which horizontally moves above a level of the cured layer with a predetermined gap kept therebetween to smooth a level of the not yet cured fluid. The optically scanning device scans a level of not yet cured fluid having been smoothed by the recoater blade, with a light beam, simultaneously with scanning of the optically scanning device. The above mentioned apparatus makes it possible to carry out an optically scanning process simultaneously with a recoat process to thereby significantly shorten a time for optical solidification and shaping. In addition, since the above mentioned apparatus optically scans and simultaneously recoats, it is scarcely necessary to stop an optically scanning process during a recoat process, thereby making it possible to effectively utilize output of an optically scanning apparatus such as a laser beam radiating device.

20 Claims, 5 Drawing Sheets

APPARATUS FOR SOLIDIFYING AND SHAPING OPTICALLY CURED FLUID BY CARRYING OUT SCANNING SIMULTANEOUSLY WITH RECOATING

BACKGROUND OF THE INVENTION

1. Field of the Invention

The invention relates to an apparatus for solidifying and shaping an optically cured fluid which apparatus is capable of carrying out a recoating process simultaneously with an optical scanning process.

2. Description of the Related Art

A process of optically solidifying and shaping is also called "rapid prototyping" or "stereolithography", and is for curing an optically cured resin with light to thereby create a three-dimensional object.

FIGS. 1A to 1D show a basic principle of a process of optically solidifying and shaping fluid that can be optically cured. First, data of a three-dimensional model 1 is generated by means of 3D-CAD or X ray CT, etc. Then, as illustrated in FIG. 1A, the data of model 1 is horizontally sliced on a computer to thereby make cross sectional slice data of three-dimensional model 1. Then, as illustrated in FIG. 1B, a laser beam 3 is scanned on a level of fluid resin 2 which can be optically cured in accordance with the slice data. The resin 2 has a characteristic that a portion thereof receiving a laser beam is cured by a certain thickness. Thus, by scanning with the laser beam 3, a cured layer 4 is formed in accordance with the cross sectional slice data of three-dimensional model 1. Then, a table 5 on which the cured layer 4 lies is lowered by a pitch equal to a thickness of the slice data of three-dimensional model 1 to thereby introduce a not-yet-cured thin resin layer onto an upper surface of the cured layer 4. During the introduction of a thin resin layer onto the cured layer 4, a member generally called a blade is used to smooth or "recoat" the uncured fluid resin ed so that the fluid resin has a flat surface. Then, the laser beam 3 is scanned onto a level of the uncured fluid resin 2 in accordance with the cross sectional slice data of 3D-model 1 to thereby form a newly-cured layer 4a, as illustrated in FIG. 1C. The thus-formed newlycured layer 4a is integral with the previously cured layer 4. By repeating the above mentioned steps mentioned with reference to FIGS. 1B and 1C, cured layers are successively formed, as illustrated in FIG. 1D, and thus the 3D-model 1 is reproduced.

The above-mentioned process has an advantage that a three-dimensional object can be directly produced based on CAD data without using a mold, and hence has been widely used in many fields such as master model making, precision casting, map editing and three-dimensional statue making. In order to enhance accuracy and efficiency of this process, Japanese Patent Publication No. 5-33900 has suggested "Method of Optically Shaping", Japanese Patent Publication No. 7-94149 has suggested "Method of Forming Multilayered Planar Object in Method of Optically Solidifying and Shaping Object", and Japanese Patent Application No. 7-302793 has suggested "Apparatus for Optically Solidifying and Shaping Object in Uniformized Surface Exposure" (This application is listed only for better understanding of the present invention. The application does not constitute prior art against the present invention.).

In the above mentioned conventional process, when a cured layer is sufficiently thick, it is possible to introduce the uncured fluid resin 2 onto an upper surface of the cured layer 4 only by lowering the cured layer 4, or only by raising a level of the uncured fluid resin 2. However, this is accompanied with a problem that a slice pitch of the model becomes rough, and hence a completed three-dimensional object has a surface full of irregularities. On the other hand, if the slice pitch is set to be smaller to thereby make a cured layer thinner in order to enhance the accuracy of the completed three-dimensional model, it becomes quite difficult to introduce the uncured fluid resin 2 onto the cured layer 4 because of the surface tension of the fluid resin 2, resulting in various problems such as that it would take much time to recoat, and that some portions of fluid resin remain unrecoated, and so on.

In order to solve those problems, WO93/24303 has suggested "Apparatus and Method of optically solidifying and shaping object with improvement in recoat process". In the suggested apparatus, a recoater, which corresponds to the above mentioned blade, is formed with a lower surface facing an upper surface of a cured layer with a space therebetween into which uncured fluid resin is introduced. The uncured fluid resin is dragged onto an upper surface of the cured layer by the lower surface of the recoater, and thus the uncured fluid resin is recoated.

However, since the apparatus suggested in WO93/24303 carries out optically scanning to thereby cure an uncured fluid resin layer after a recoat process is completed and, as a result, an uncured fluid resin layer is formed on the cured layer, it is necessary to alternately carry out a recoat process and an optically scanning process, which cause the problem that it is impossible to shorten the time for carrying out the optical solidifying and shaping process.

In addition, the above mentioned apparatus has another problem, in that since the optical scanning process has to be paused during the recoat process, and therefore outputs from the light emitting device such as a laser radiating device cannot be effectively utilized. Furthermore, it is necessary in the above mentioned conventional apparatus to precisely control the level of uncured fluid resin in order to form cured layers having an accurately controlled thickness.

SUMMARY OF THE INVENTION

In view of the foregoing problems of the prior art, it is an object of the present invention to provide an apparatus for optically solidifying and shaping a fluid resin, which apparatus is capable of carrying out an optical scanning process at least partly simultaneously with a recoat process to thereby significantly shorten a time required for carrying out the optical solidifying and shaping process, and to provide an apparatus which is also capable of effectively utilizing output emitted from a light emitting device, and which apparatus makes it no longer necessary to accurately control the level of uncured fluid resin.

There is provided an apparatus for solidifying and shaping fluid which can be optically cured, including (a) an optical scanning device for scanning a level of fluid which can be optically cured, with a light beam, (b) a sinking device for sinking a layer cured by scanning carried out by the optical scanning device, below a level of the fluid, and (c) a recoat device for covering a cured layer having been sunk in the step (b), with an uncured fluid. In the apparatus, the recoat device is formed with a recoater blade which horizontally moves above a level of the cured layer with a predetermined gap kept therebetween to smooth a level of the uncured fluid. The optical scanning device scans a level of uncured fluid having been smoothed by the recoater blade, with a light beam simultaneously with scanning of the optical scanning device.

In a preferred embodiment, the sinking device keeps a level of uncured fluid above a lower surface of the recoater blade. The sinking device also keeps a level of uncured fluid below a lower surface of the recoater blade.

In addition, the optical scanning device includes a laser radiating device for emitting a laser beam, and a scanner for introducing the laser beam to a level of fluid having been smoothed by the recoater blade. The recoater blade is formed at a front surface with respect to a direction in which the recoater blade moves with a tapered edge defining a tapered surface on which uncured fluid is preserved.

The recoater blade is formed with a lower surface which is in contact with a level of fluid having been smoothed but does not adhere with the cured layer, and a light transmissible portion through which a light beam is able to transmit to the lower surface, a light beam passing through the light transmissible portion causing fluid in contact with the lower surface of the recoater blade to cure.

There is further provided an apparatus for solidifying and shaping fluid which can be optically cured, including (a) an optical scanning device for scanning a level of optically curable fluid with a light beam, (b) a sinking device for sinking a layer having been cured by scanning carried out by the optical scanning device, below a level of the fluid, and (c) a recoat device for covering a cured layer having been sunk in the step (b), with a fluid which is not yet cured, the recoat device being formed with a recoater blade which horizontally moves above a level of the cured layer with a predetermined gap kept therebetween to smooth a level of the uncured fluid, the recoater blade being formed at opposite surfaces thereof as observed in a direction in which the recoat device moves with tapered edges each defining a tapered surface on which fluid not yet cured is preserved, the optically scanning device scanning a level of not yet cured fluid having been smoothed by the recoater blade, with a light beam simultaneously with scanning of the optically scanning device.

In a preferred embodiment, the sinking device keeps a level of uncured fluid above a lower surface of the recoater blade. As an alternative, the sinking device may keep a level of uncured fluid below a lower surface of the recoater blade.

In another preferred embodiment, the optical scanning device includes a laser radiating device for emitting a laser beam, and a scanner for introducing the laser beam to a level of fluid having been smoothed by the recoater blade.

In still another preferred embodiment, the recoater blade is formed with a lower surface which is in contact with a level of smoothed fluid but does not adhere with the cured layer, and a light transmissible portion through which a light beam is able to transmit to the lower surface, a light beam passing through the light transmissible portion causing fluid in contact with the lower surface of the recoater blade to cure.

In yet preferred embodiment, the light transmissible portion is disposed intermediate between the tapered edges. For instance, the light transmissible portion is made of quartz glass.

The sinking device may preferably include a table which is vertically movable. It is preferable that the recoater blade moves at a speed of about 1 mm/s. It is also preferable that the optically curable fluid has a viscosity of about 400 cps.

In accordance with the above mentioned present invention, a recoater blade of a recoat device horizontally moves above an upper surface of a cured layer with a certain space therebetween to thereby smooth or recoat an upper surface of uncured fluid resin, and simultaneously an optical scanning device scans a fluid resin surface having been smoothed by the moving recoater blade with a light beam.

Thus, a recoat process and an optical scanning process are simultaneously carried out, and hence the present invention makes it possible to significantly shorten a time for carrying out optical solidifying and shaping process in comparison with a conventional apparatus in which a recoat process and an optical scanning process are alternately carried out. The above mentioned certain space corresponds to a thickness of a fluid resin layer to be cured by optical scanning at one time.

In addition, in accordance with the present invention, since a recoat process is carried out simultaneously with an optical scanning process, it is no longer necessary to pause an optical scanning process during a recoat process, resulting in that it is now possible to effectively utilize output emitted from an optical scanning device such as a laser radiating device. Furthermore, the accuracy of the thickness of the cured layer is dependent on a space between a lower surface of a recoater blade and an upper surface of the cured layer, that is, the above mentioned certain space, and excessive uncured fluid resin stays and is preserved at a front of a recoater blade. Hence, the level of uncured fluid resin is kept above a lower surface of the recoater blade, and it is no longer necessary to accurately control the level of uncured fluid resin. In addition, even if a level of uncured fluid resin is kept below a lower surface of the recoater blade, it is possible to stably supply fluid resin not yet cured because of the surface tension of the uncured fluid resin.

The above and other objects and advantageous features of the present invention will be made apparent from the following description made with reference to the accompanying drawings, in which like reference characters designate the same or similar parts throughout the drawings.

DESCRIPTION OF THE PREFERRED EMBODIMENTS

Figure 1A:
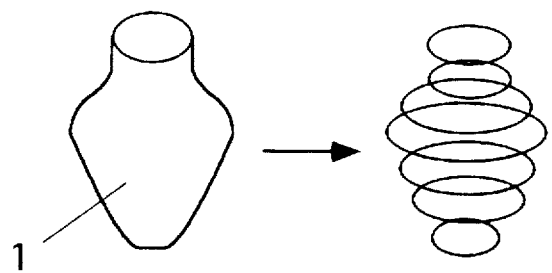
FIGS. 1A to 1D show a basic principle of a conventional method of optically solidifying and shaping optically curable fluid resin.
Figure 1B:
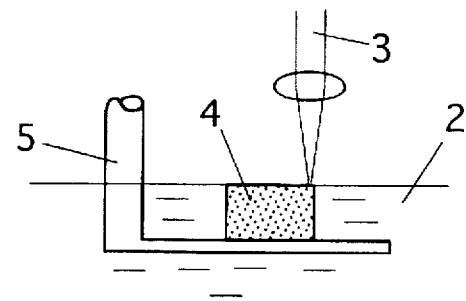
Figure 1C:
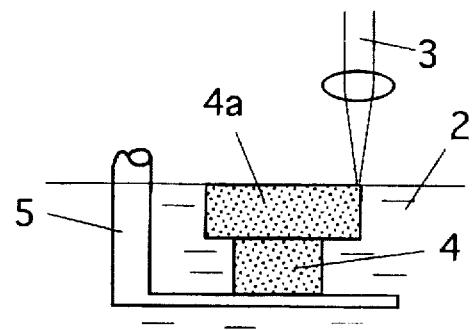
Figure 1D:
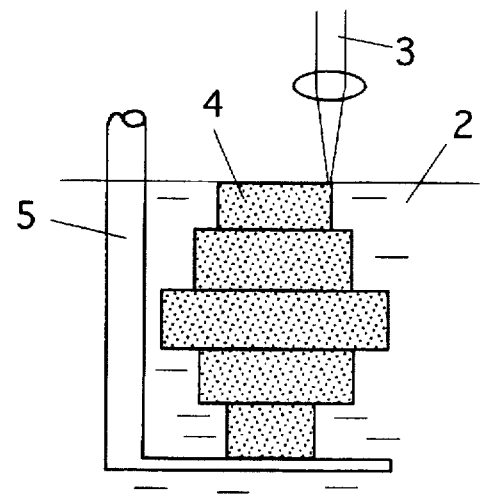
Figure 2:
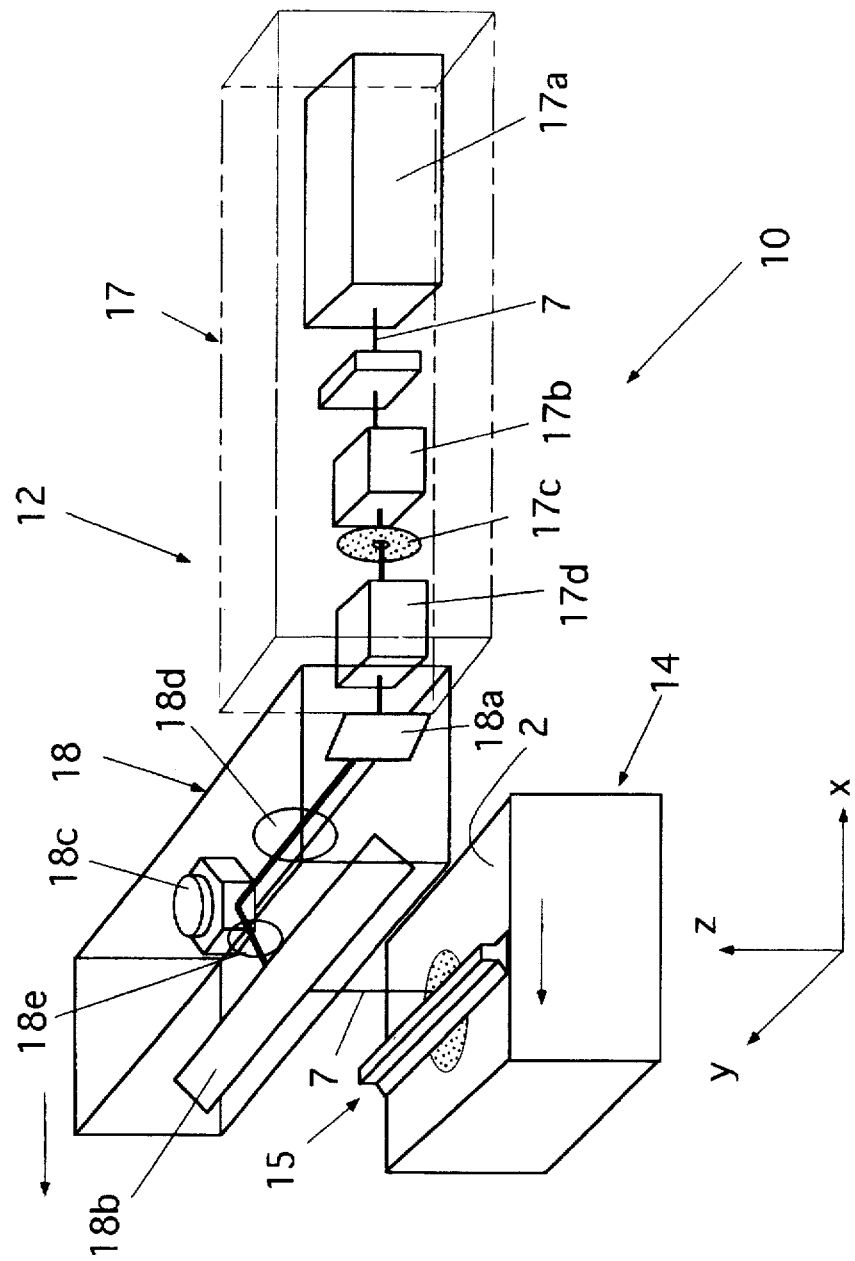
FIG. 2 is a perspective view illustrating an apparatus for carrying out an optical solidifying and shaping process in accordance with an embodiment of the present invention.
Figure 3:
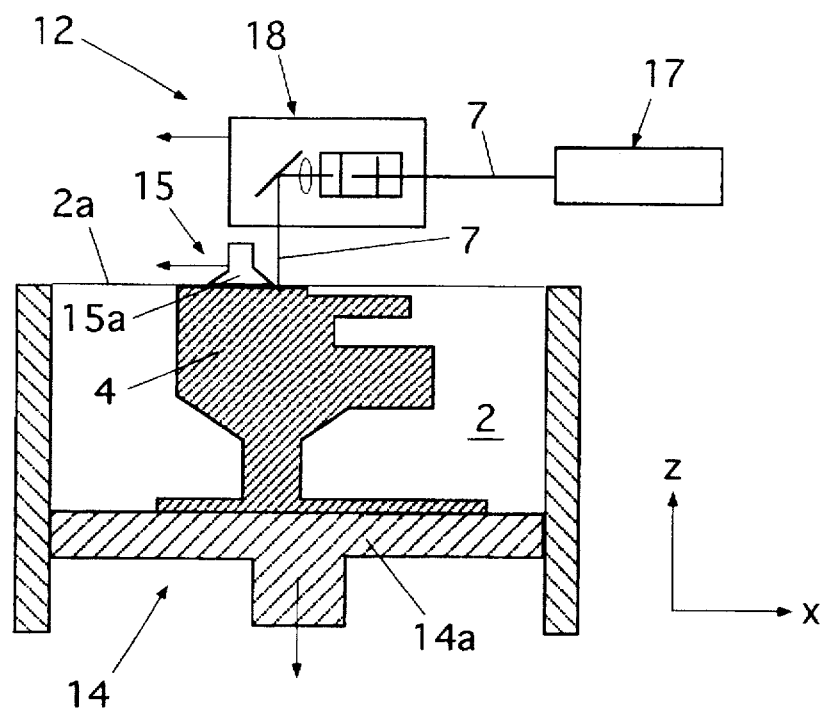
FIG. 3 is a cross-sectional view of the apparatus illustrated in FIG. 2.

Preferred embodiments in accordance with the present invention will be explained hereinbelow with reference to the drawings. With reference to FIGS. 2 and 3, an apparatus 10 for optically solidifying and shaping fluid resin includes an optical scanning device 12, a sinking device 14 and a recoat device 15. The optical scanning device 12 includes a laser radiating device 17 for radiating a laser beam 7, and a scanner device 18 for introducing the laser beam 7 onto a level of fluid resin 2 which is cured by light radiation.

With reference to FIG. 2, the laser radiating device 17 includes a laser oscillator 17a, a modulator or shutter 17b, an iris 17c and a beam expander 17d. The laser radiating device 17 regulates the laser beam 7 into a beam having an appropriate diameter, such as, about 0.05 mm, and radiates the thus regulated beam in an X-axis direction or a sub-scanning direction into the scanner device 18. The laser oscillator 17a is required to radiate a laser beam suitable for curing the optically curable fluid resin 2. For instance, the laser oscillator 17a is preferably an Ar laser beam oscillator or a He-Cd laser beam oscillator.

With reference again to FIG. 2, the scanner device 18 includes reflection mirrors 18a and 18b, a polygon mirror 18c and lenses 18d and 18e. The laser beam 7 introduced into the scanner device 18 is reflected by the reflection mirror 18a horizontally in a Y-axis direction or a scanning direction into the polygon mirror 18c. The laser beam is horizontally scanned by the rotation of the polygon mirror 18c, and the thus scanned laser beam is perpendicularly, downwardly reflected by the reflection mirror 18b. The lenses 18d and 18e focus the laser beam onto a level of the fluid resin 2.

The laser beam 7 radiated from the laser radiating device 17 is perpendicularly, downwardly reflected by the scanner device 18 as well as scanned in a Y-axis direction by the rotation of the polygon mirror 18c to thereby be focused on a level of the fluid resin 2. Thus, a portion of the fluid resin 2 onto which the laser beam is radiated is optically cured. The laser radiating device 17 and the scanner device 18 do not always need to have the above mentioned structure, but may have another structure.

As illustrated in FIG. 3, the sinking device 14 includes a table 14a which is downwardly movable in a Z-axis direction. By lowering the table 14a, it is possible to sink a cured layer 4 below a level of the uncured fluid resin 2 which layer has been optically cured by being scanned with the laser beam. A level 2a of the fluid resin 2 is kept uniform by means of a leveller (not illustrated) which would supply the fluid resin 2 to the sinking device 14.

Figures 4A, 4B:
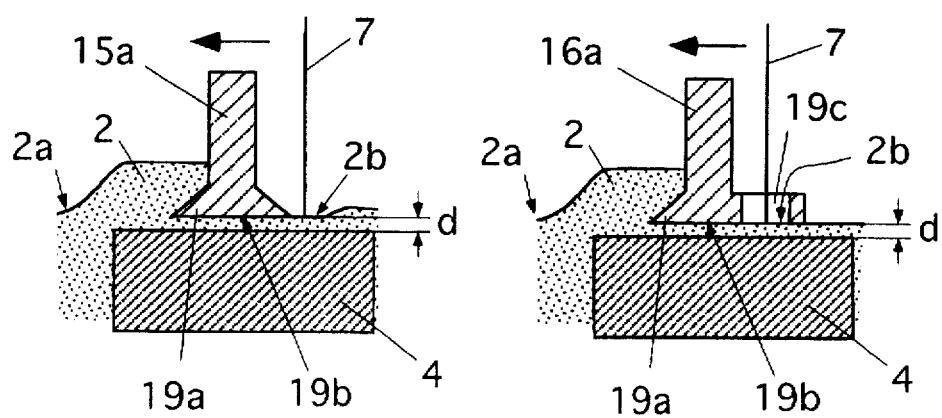
FIG. 4A is a cross-sectional view of a recoater blade and fluid resin recoated by the recoater blade.
FIG. 4B is a cross-sectional view of another recoater blade and fluid resin recoated by the recoater blade.

As illustrated in FIG. 4A, the recoat device 15 includes a recoater blade 15a horizontally movable with a certain gap "d" being kept above an upper surface of the cured layer 4. The uncured fluid resin 2 is made flat or recoated by the horizontal movement of the recoater blade 15a with the result that the sunk cured layer 4 is covered with a thin uncured fluid resin layer. The sinking device 14 keeps a level 2a of the uncured fluid resin 2 above a level 2b of the fluid resin 2 having been smoothed by the recoater blade 15a. The above mentioned certain gap "d" corresponds to a thickness of a fluid resin layer to be cured by optically scanning one time.

The above mentioned arrangement makes it possible for a lower surface of the recoater blade 15a to sink below a level of the uncured fluid resin. Thus, the dragging performance of the recoater blade 15a and dead weight of the fluid resin 2 which functions to keep a level of the fluid resin 2 horizontal cooperate with each other to thereby make it possible to cover the sunk cured layer 4 with the thin uncured fluid resin layer within a short period of time.

FIGS. 4A and 4B illustrated cross-sections of the recoater blades and the level 2b of the fluid resin 2 smoothed by the horizontal movement of the recoater blades indicated with an arrow. Hereinbelow, the recoater blade illustrated in FIG. 4A is called a half-regulation blade 15a, and the recoater blade illustrated in FIG. 4B is called a regulation blade 16a.

As illustrated in FIGS. 4A and 4B, the recoater blades 15a and 16a are formed at a front as observed in a direction in which the recoater blades 15a and 16a move with tapered edge portions 19a defining a tapered upper surface on which the uncured fluid resin 2 is preserved when the recoater blades 15a and 16a move with being sunk below the level 2a of the uncured fluid resin 2. The tapered edge portion 19a defining a tapered upper surface makes it possible to preserve thereon the uncured fluid resin 2 and thus stably supply the uncured fluid resin 2 to a space between a lower surface 19b of the recoater blades 15a and 16a and an upper surface of the cured layer 4 without allowing bubbles to intrude.

The half-regulation blade 15a illustrated in FIG. 4A temporarily forms the smoothed level 2b at the rear of the recoater blade 15a which is sunk into the uncured fluid resin 2 and moves horizontally in a direction indicated with an arrow. Even when the level 2a of the uncured fluid resin 2 is situated higher than the level 2b of the smoothed fluid resin 2, the level 2b of the smoothed fluid resin 2 is kept flat for a certain period of time, such as a few seconds, because of the viscosity of the uncured fluid resin 2. Hereinafter, the uncured fluid resin 2 at the level 2a higher than the level 2b of the smoothed fluid resin 2 flows over the uncured fluid resin 2 because of the dead weight thereof, thereby the level 2b of the smoothed fluid resin 2 is covered with the uncured fluid resin 2.

The scanner device 18 is designed to move synchronously with and in the same direction as the recoater blade 15a, and thus the optically scanning device 12 is able to simultaneously scan the level 2b of the fluid resin 2 smoothed or recoated by the moving recoater blade 15a. Thus, the half-regulation blade 15a of the recoat device 15 is able to horizontally move with the certain gap "d" being kept away from an upper surface of the cured layer to thereby smooth the uncured fluid resin 2 , and at the same time, the optical scanning device 12 is able to optically scan the level 2b of the fluid resin smoothed or made flat by the moving recoater blade 15a. That is, the recoat process and the optical scanning process can be simultaneously carried out, and hence the embodiment makes it possible to significantly shorten the time required for carrying out the optical solidifying and shaping process in comparison with a conventional apparatus in which a recoat process and an optical scanning process are carried out alternately.

The regulation blade 16a illustrated in FIG. 4B forms the smoothed level 2b thereunder by means of a lower surface 19b. The recoater blade 16a is formed with a lower surface 19b which is in contact with the level 2b of the smoothed fluid resin 2 but does not adhere with the cured layer 4. The recoated blade is also provided with a light transmissible window 19c through which a laser beam is able to transmit to the lower surface 19b. The lower surface 19b which does not adhere to the cured layer 4 can be fabricated by coating or applying a film readily peeled off from resin onto a lower surface of the recoater blade 16a. For instance, such a film may be made of TEFLON, or polyterafluoroethylene. It is preferable that the light transmissible window 19c is made of quartz glass absorbing only a little amount of light. Thus, the laser beam 7 passes through the light transmissible window 19c of the recoater blade 16a and reaches the level 2b of the uncured fluid resin 2 in contact with the lower surface 19b, to thereby cure the fluid resin 2. Since the level 2b is regulated by the recoater blade 16a, it is possible to enhance the accuracy in height with which the cured layers 4 are deposited on one another.

Figure 5A:
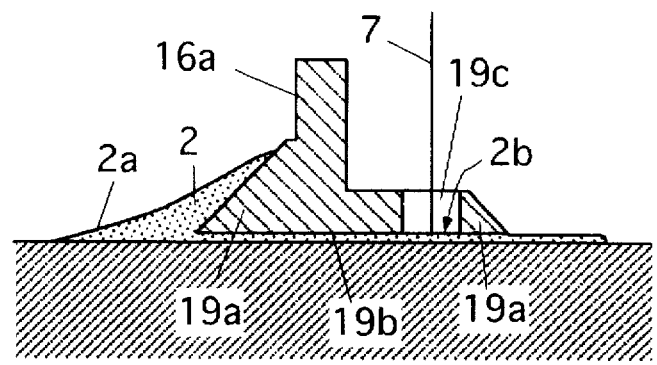
FIG. 5A is a cross-sectional view of still another recoater blade according to the present invention.
Figure 5B:
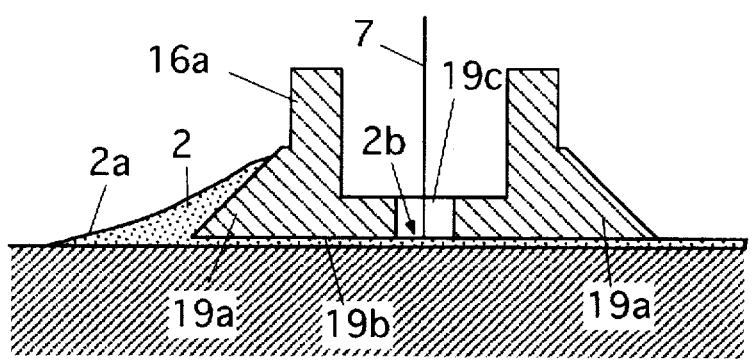
FIG. 5B is a cross-sectional view of yet another recoater blade according to the present invention.

FIGS. 5A and 5B show other embodiments of the regulation blade 16a. The regulation blade 16a illustrated in FIG. 5A is formed at the rear, as observed in a direction in which the regulation blade 16a moves, with an additional upper tapered edge 19a. The formation of the additional upper tapered edge 19a makes it possible to reduce the resistance which the recoater blade 16a returns back in an X-axis direction. The regulation blade 16a illustrated in FIG. 5B is formed at the front and rear thereof with the same tapered edges 19a. Light transmissible window 19c is provided between edges 19a so that the uncured fluid resin 2 does not flow into the window 19c. The regulation blade 16a illustrated in FIG. 5B makes it possible to carry out a recoat process as well as an optical scanning process when the regulation blade 16a moves both forward and backward.

Figure 6:
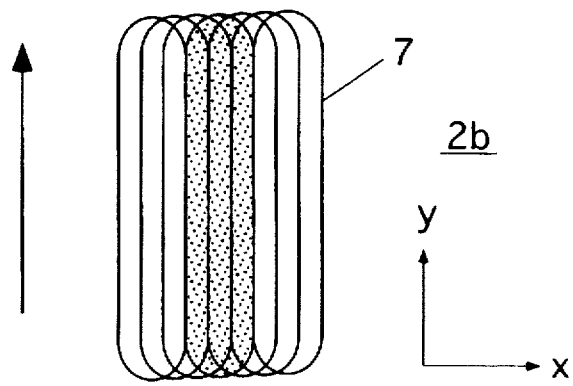
FIG. 6 schematically shows loci of laser beams radiated onto a level of fluid resin.

FIG. 6 schematically shows loci of a laser beam radiated onto the level 2b of the uncured fluid resin 2. As illustrated, it is preferable that the laser beam 7 is scanned onto the level 2 in an overlapping fashion to thereby give the uncured fluid resin 2 the energy necessary to be optically cured. Scanning in an overlapping fashion makes it possible to avoid a portion from being rapidly, optically cured, and thus minimizes deformation of the cured layer 4 caused by consendation which would occur while the fluid resin 2 is being optically cured. The laser beam 7 can be scanned in a Y-axis direction at a higher speed by making the polygon mirror 18c rotate at a higher speed.

Hereinbelow are explained the results of experiments conducted with the apparatus made in accordance with the present invention. In the experiments, as dummy material for the uncured fluid resin 2, there was used millet jelly having almost the same viscosity as that of the uncured fluid resin 2. In addition, in order to make a comparison, the experiments were conducted with water having much different viscosity from the uncured fluid resin 2. Specifically, the millet-jelly has a viscosity of 400 cps at 20° C., and water has a viscosity of 1 cps at 20° C. The experiments were conducted at blade speeds of both 1 mm/s and 50 mm/s. The experiments were also conducted both with a lower surface of a blade being sunk below a level of fluid (hereinbelow, referred to as "sink type") and with a lower surface of a blade being disposed above a level of fluid to thereby pull up the fluid with a surface tension of the fluid (hereinafter, referred to as "surface tension type"). The sink type method is adopted when the present invention is reduced to practice.

Figure 7A:
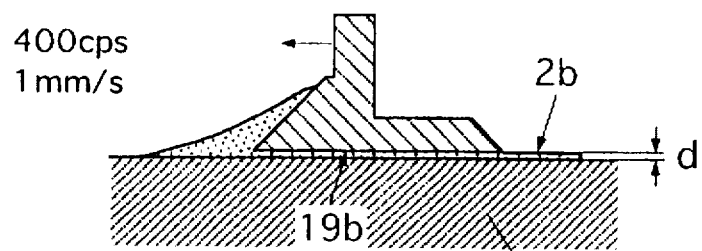
FIGS. 7A to 7E schematically shows experimental results.
Figure 7B:
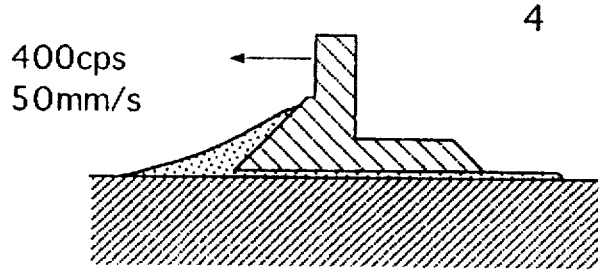

FIGS. 7A to 7E schematically show the results of the experiments. FIGS. 7A and 7B show the cases to which the present invention was applied. The conditions were 400 cps, 1 mm/s and sink type in FIG. 7A, and 400 cps, 50 mm/s and sink type in FIG. 7B. The gap "d" between the lower surface 19b of the blade and an upper surface of the cured layer 4 was set in the range of from 0.1 mm to 0.5 mm in the cases shown in FIGS. 7A and 7B. The level 2b of the smoothed sample fluid which was temporarily formed at the rear to the moving recoater blade 15a was slightly lower than the lower surface 19b of the recoater blade 15a in FIG. 7A, whereas level 2b was completely the same height as the lower surface 19b of the recoater blade 15a in FIG. 7B. Thus, it is understood that the level 2b of the smoothed sample fluid can be temporarily formed at the rear to the moving recoater blade 15a sunk below a level of the sample fluid. In addition, it was confirmed that the sample fluid was preserved on a tapered surface defined by the tapered edge 19a when the recoater blade 15a moved b while sunk below the level of the sample fluid, and that the sample fluid preserved on the tapered surface was stably supplied to a space between the lower surface 19b of the recoater blade 15a and an upper surface of the cured layer.

Figure 7C:
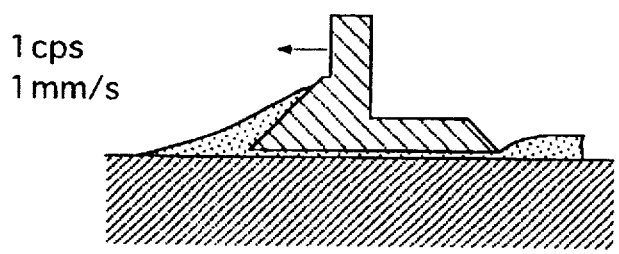
Figure 7D:
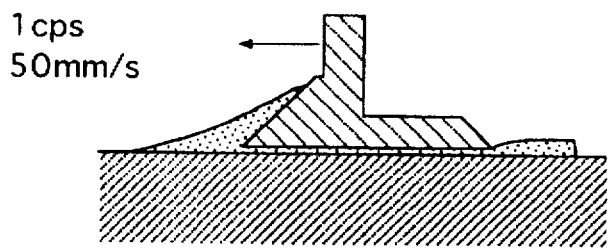

FIGS. 7C and 7D show reference cases. The conditions were 1 cps, 1 mm/s and sink type in FIG. 7C, and 1 cps, 50 mm/s and sink type in FIG. 7D. The other experimental conditions were the same as those of the cases shown in FIGS. 7A and 7B. If sample fluid had viscosity much smaller than the viscosity (400 cps) of optically curable fluid resin , the level 2b of the sample fluid at the rear of the recoater blade was higher than the gap "d", specifically two to three times higher than the gap "d", as illustrated in FIGS. 7C and 7D. Thus, it is understood that the accuracy in height with which the cured layers 4 are deposited one on another is significantly deteriorated.

Figure 7E:
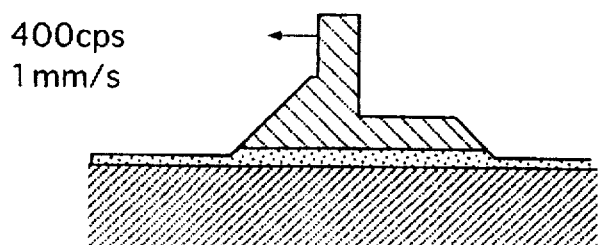

FIG. 7E shows the case of 400 cps, 1 mm/s and surface tension type. In the surface tension type, the level 2b of the smoothed sample fluid at the rear of the recoater blade was lower than the gap "d", specifically about half of the gap "d" in height. Similarly to the cases illustrated in FIGS. 7C and 7D, it is understood that the accuracy in height with which the cured layers 4 are deposited on one another is significantly deteriorated.

The following was confirmed based on the above mentioned experimental results.

1. A front end of a recoater blade receives greater influence from surface tension at a greater blade speed. In the apparatus made in accordance with the present invention, the blade speed is preferably about 1 mm/s, at which speed it is believed that the optically curable fluid resin (about 400 cps) behaves statically.
2. In order to form a more stable film, the optically curable fluid resin preferably has greater fluid a viscosity. It is preferable that the fluid resin has viscosity of about 400 cps.
3. Fluid tends to behave statically at a low speed of about 1 mm/s. Thus, there is almost no risk that a tapered surface of the rear of the recoater blade will become wet.
4. The sink type method where a required amount of fluid resin is preserved at a front of a recoater blade is preferable for supplying fluid resin.
5. The laser beam is to be radiated to a recoater blade preferably at a point offset from a front end of the blade by a length equal to a diameter of the laser beam.

As described in connection with the preferred embodiments, in accordance with the above mentioned present invention, a recoating process and an optical scanning process are simultaneously carried out, and hence the present invention makes it possible to significantly shorten the time required for carrying out an optical solidifying and shaping process in comparison with a conventional apparatus in which a recoating process and an optically scanning process are alternately carried out. In addition, in accordance with the present invention, since a recoating process is carried out simultaneously with an optically scanning process, it is no longer necessary to pause the optically scanning process during the recoating process. As a result, it is now possible to effectively utilize the output emitted from an optical scanning device such as a laser radiating device. Furthermore, the accuracy of the thickness of the result that cured layer is dependent on a gap "d" between a lower surface of the recoating blade and an upper surface of the cured layer. That is, according to the invention, gap is achieved the above mentioned, and excessive uncured fluid resin stays and is preserved at a front of the recoating blade. Hence, the level of uncured resin is kept above a lower surface of a recoater blade, and it is no longer necessary to accurately control the level of uncured fluid resin. In addition, even if the level of uncured fluid resin is kept below a lower surface of a recoater blade, it is possible to stably supply uncured fluid resin because of the surface tension of the uncured fluid resin.

While the present invention has been described in connection with certain preferred embodiments, it is to be understood that the subject matter encompassed by way of the present invention is not to be limited to those specific embodiments. On the contrary, it is intended for the subject matter of the invention to include all alternatives, modifications and equivalents as can be included within the spirit and scope of the following claims.

What is claimed is:

1. An apparatus for solidifying and shaping optically curable fluid resin, comprising:
   (a) an optical scanning device for scanning a level of optically curable fluid resin with a light beam,
   (b) a sinking device for sinking a layer of resin cured by scanning below a level of the optically curable fluid resin, and
   (c) a recoat device for recoating the resin cured by scanning with optically curable fluid resin, having a recoater blade constructed to move horizontally above the resin cured by scanning by a predetermined gap and smooth the optically curable fluid resin, wherein said scanning device is constructed to scan synchronously with the recoating blade to thereby scan the optically curable fluid resin smoothed by the recoater blade.

2. An apparatus for solidifying and shaping optically curable fluid resin, comprising:
   (a) an optical scanning device for scanning a level of optically curable fluid resin with a light beam,
   (b) a sinking device for sinking a layer of resin cured by scanning below a level of the optically curable fluid resin, and
   (c) a recoat device for recoating the resin cured by scanning with optically curable fluid resin, having a recoater blade constructed to move horizontally above the resin cured by scanning by a predetermined gap and smooth the optically curable fluid resin, wherein the recoating blade has (1) a lower surface for contact with the optically curable fluid resin constructed not to adhere to the layer cured by scanning, and (2) a light transmissible portion, wherein said scanner transmits the light beam through the transmissible portion to cure the fluid resin in contact with the lower surface of the recoater blade.

3. An apparatus for solidifying and shaping optically curable fluid resin, comprising:
   (a) an optical scanning device for scanning a level of optically curable fluid resin with a light beam,
   (b) a sinking device for sinking a layer of resin cured by scanning below a level of the optically curable fluid resin, and
   (c) a recoat device for recoating the resin cured by scanning with optically curable fluid resin, having a recoater blade constructed to move horizontally above the resin cured by scanning by a predetermined gap and smooth the optically curable fluid resin, said recoating blade having front and rear tapered edges defining respective front and rear tapered surfaces,
   where in said scanning device is constructed to scan synchronously with the recoating blade to thereby scan the optically curable fluid resin smoothed by the recoater blade.

4. An apparatus for solidifying and shaping optically curable fluid resin, comprising:
   (a) an optical scanning device for scanning a level of optically curable fluid resin with a light beam,
   (b) a sinking device for sinking a layer of resin cured by scanning below a level of the optically curable fluid resin, and
   (c) a recoat device for recoating the resin cured by scanning with optically curable fluid resin, having a recoater blade constructed to move horizontally above the resin cured by scanning by a predetermined gap and smooth the optically curable fluid resin, said blade having (1) front and rear tapered edges defining respective front and rear tapered surfaces, (2) a lower surface for contact with the optically curable fluid resin constructed not to adhere to the layer cured by scanning, and (3) a light transmissible portion,
   wherein said scanner transmits the light beam through the transmissible portion to cure the fluid resin in contact with the lower surface of the recoater blade.

5. The apparatus as set forth in claim 1, wherein said sinking device operates to keep a level of uncured fluid resin above a lower surface of said recoater blade.

6. The apparatus as set forth in claim 1, wherein said sinking device operates to keep a level of uncured fluid resin below a lower surface of said recoater blade.

7. The apparatus as set forth in claim 1, wherein said optical scanning device includes a laser radiating device for emitting a laser beam, and a scanner for directing said laser beam to said fluid smoothed by said recoater blade.

8. An apparatus according to claim 7, wherein said scanner further comprises a first fixed reflection mirror for reflecting light from said laser radiating device, and a rotating polygonal mirror for reflecting a beam received from the first fixed reflection mirror, and a second fixed reflection mirror for directing light reflected from the rotating polygonal mirror to said optically curable fluid.

9. The apparatus as set forth in claim 1, wherein said recoater blade comprises a front tapered surface as observed in a direction in which said recoater blade moves.

10. The apparatus as set forth in claim 2, wherein said light transmissible portion comprises quartz glass.

11. The apparatus as set forth in claim 1, wherein said sinking device includes a vertically movable table.

12. The apparatus as set forth in claim 1, wherein said recoater blade moves at a speed of about 1 mm/s.

13. The apparatus as set forth in claim 3, wherein said sinking device operates to keep a level of optically cured fluid above a lower surface of said recoater blade.

14. The apparatus as set forth in claim 3, wherein said sinking device operates to keep a level of optically curable fluid resin below a lower surface of said recoater blade.

15. The apparatus as set forth in claim 3, wherein said optically scanning device includes a laser radiating device for emitting a laser beam, and a scanner for directing said laser beam to said fluid resin smoothed by said recoating blade.

16. An apparatus according to claim 15, wherein said scanner further comprises a first fixed reflection mirror for reflecting light from said laser radiating device, and a rotating polygonal mirror for reflecting a beam received from the first fixed reflection mirror, and a second fixed reflection mirror for directing light reflected from the rotating polygonal mirror to said optically curable fluid.

17. The apparatus as set forth in claim 4, wherein said light transmissible portion is disposed intermediate between said tapered edges.

18. The apparatus as set forth in claim 4, wherein said light transmissible portion comprises quartz glass.

19. The apparatus as set forth in claim 3, wherein said sinking device includes a vertically movable table.

20. The apparatus as set forth in claim 3, wherein said recoating blade moves at a speed of about 1 mm/s.

* * * * *